(12) United States Patent
Gill

(10) Patent No.: US 7,140,146 B2
(45) Date of Patent: Nov. 28, 2006

(54) JIG AND BAIT SYSTEM

(76) Inventor: Andy T. Gill, 15950 Avalon, Olathe, KS (US) 66062

( * ) Notice: Subject to any disclaimer, the term of this patent is extended or adjusted under 35 U.S.C. 154(b) by 0 days.

(21) Appl. No.: 10/923,641

(22) Filed: Aug. 20, 2004

(65) Prior Publication Data

US 2006/0037232 A1 Feb. 23, 2006

(51) Int. Cl.
*A01K 85/00* (2006.01)

(52) U.S. Cl. .................................. 43/42.39

(58) Field of Classification Search .............. 43/42.39, 43/42.43, 42.4, 43.2, 43.4
See application file for complete search history.

(56) References Cited

U.S. PATENT DOCUMENTS

| | | | |
|---|---|---|---|
| 1,538,909 A | | 5/1925 | Shannon |
| 1,609,209 A | * | 11/1926 | Schnell ................ 43/42.08 |
| 1,644,151 A | | 10/1927 | Rodgers |
| 3,191,336 A | | 6/1965 | Cordell, Jr. |
| 3,750,321 A | | 8/1973 | McClellan |
| 4,219,956 A | | 9/1980 | Hedman |
| 4,334,381 A | | 6/1982 | Carver et al. |
| 4,367,607 A | | 1/1983 | Hedman |
| 4,530,179 A | | 7/1985 | Larew |
| 4,640,041 A | | 2/1987 | Stanley |
| 4,841,665 A | | 6/1989 | McGahee |
| 5,117,573 A | * | 6/1992 | Semler ................. 43/42.28 |
| D329,487 S | | 9/1992 | Pruiksma |
| D330,244 S | | 10/1992 | Pruiksma |
| 5,175,955 A | * | 1/1993 | Wilson et al. ........... 43/42.36 |
| 5,182,876 A | * | 2/1993 | Lewis .................. 43/42.39 |
| 5,216,830 A | * | 6/1993 | Brott, II .............. 43/42.39 |
| 5,220,743 A | | 6/1993 | McClellan |
| 5,231,786 A | * | 8/1993 | Hughes ................ 43/42.39 |
| 5,335,443 A | | 8/1994 | Grigsby, Jr. |
| 5,548,920 A | | 8/1996 | Peddycoart |
| 5,551,185 A | * | 9/1996 | Reed .................. 43/42.39 |
| 5,664,364 A | | 9/1997 | Clark |
| 5,784,827 A | | 7/1998 | Jimenez, Jr. et al. |
| 5,890,317 A | | 4/1999 | Hollomon |
| 5,899,015 A | * | 5/1999 | Link .................. 43/42.39 |
| 5,904,001 A | | 5/1999 | Rabideau |
| 6,233,863 B1 | * | 5/2001 | Dotson ................ 43/42.09 |
| 6,240,672 B1 | * | 6/2001 | Huppert ............... 43/44.8 |
| 6,405,477 B1 | | 6/2002 | Huppert |
| 6,519,895 B1 | | 2/2003 | Bennett |
| D474,523 S | | 5/2003 | Renosky |
| 6,772,553 B1 | * | 8/2004 | Phillips et al. ......... 43/42.39 |

* cited by examiner

*Primary Examiner*—Kurt Rowan
(74) *Attorney, Agent, or Firm*—Mark E. Brown

(57) ABSTRACT

A jig and bait fishing system is provided which includes various fanciful and realistic shapes for attracting and capturing fish. The system includes a body connected to a neck and a bait keeper; the neck being adapted for securing skirt material for avoiding underwater obstructions. The bait keeper secures bait and in particular internally reinforced artificial bait at the reinforced area in combination with the reinforcing material. The system also provides for a fishhook for capturing the fish and hooking the bait. The system includes a latch which prevents the fish from spitting-out the hook after capture.

1 Claim, 12 Drawing Sheets

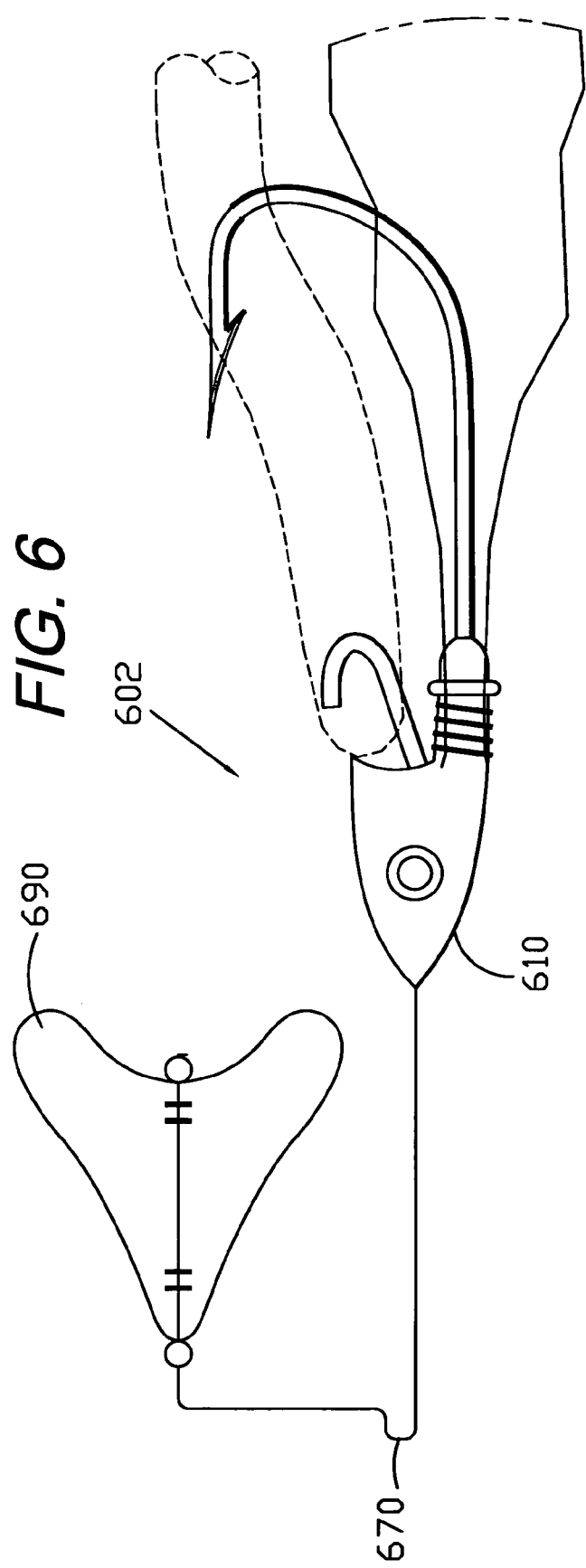

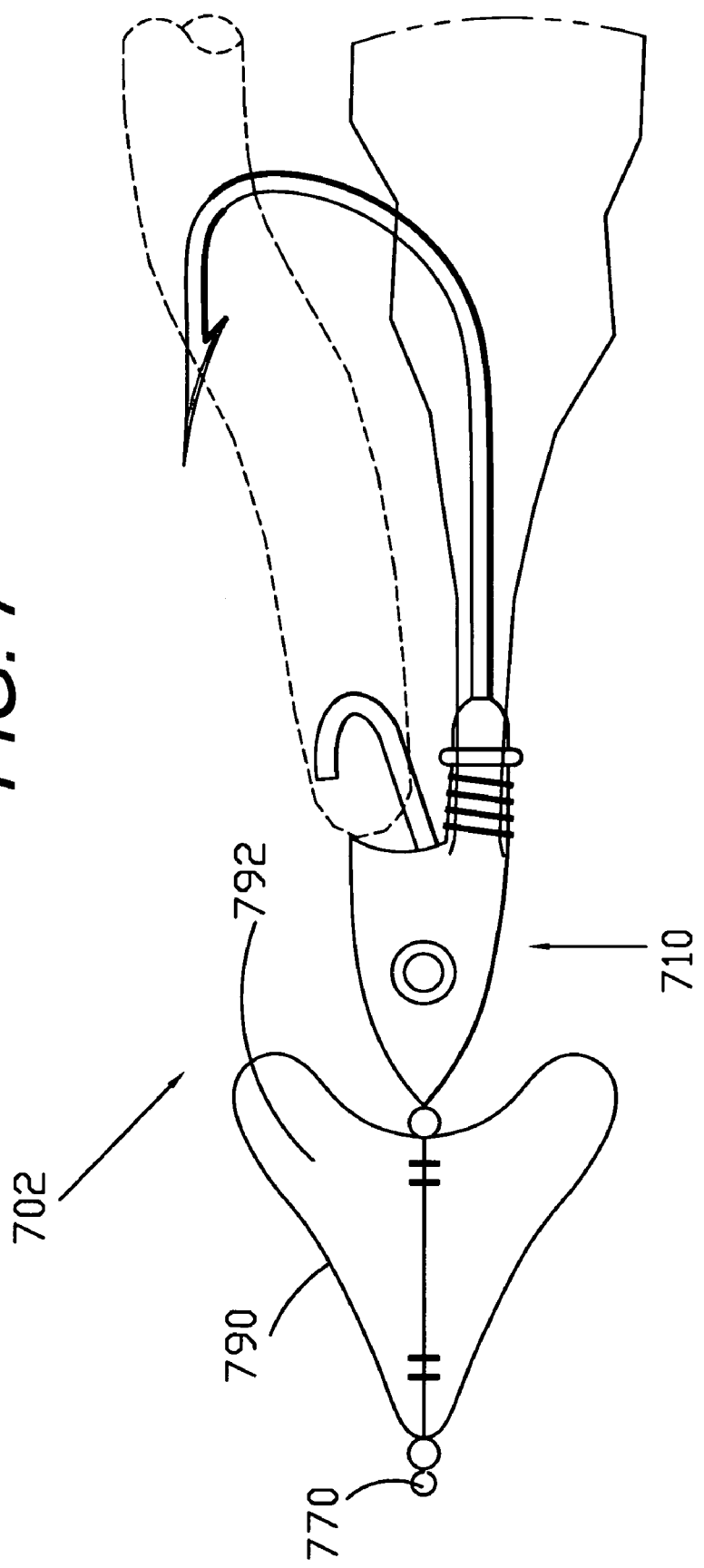

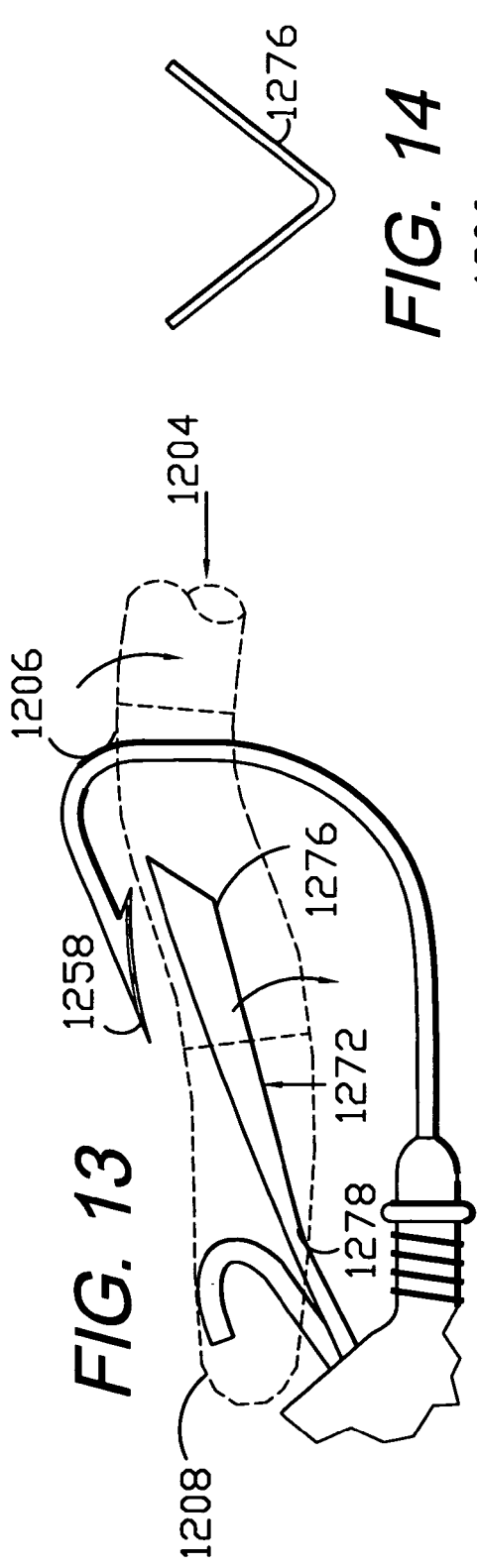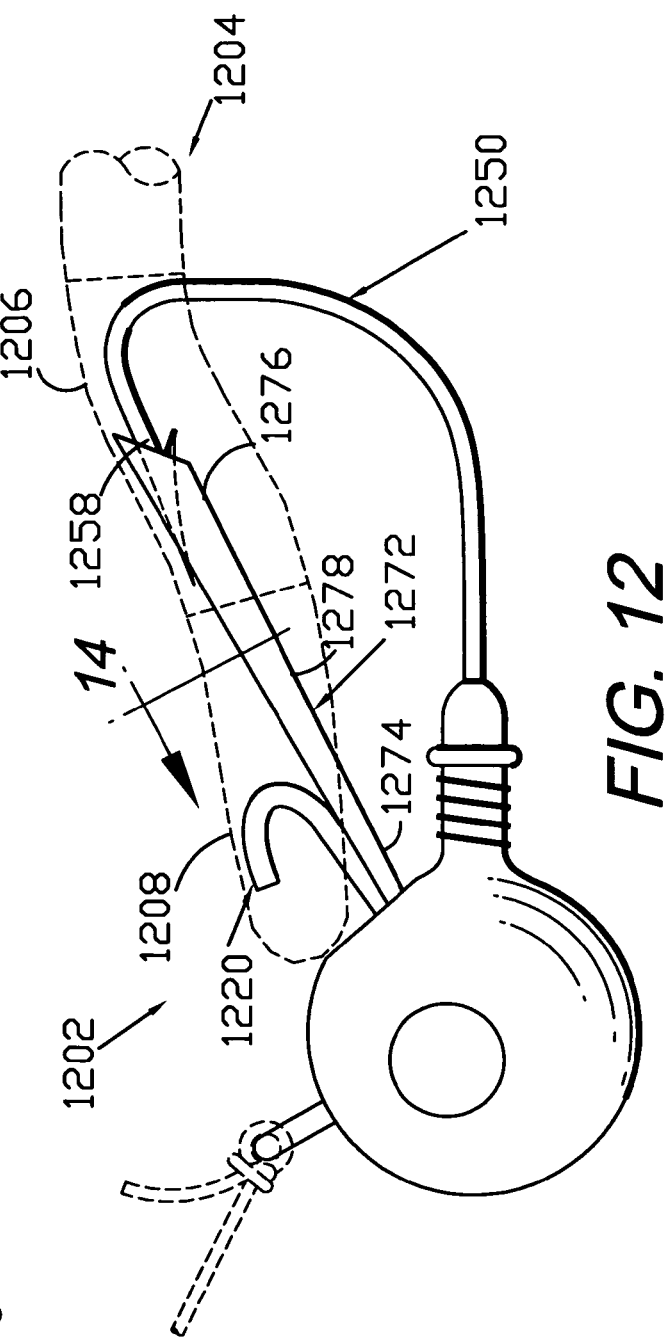

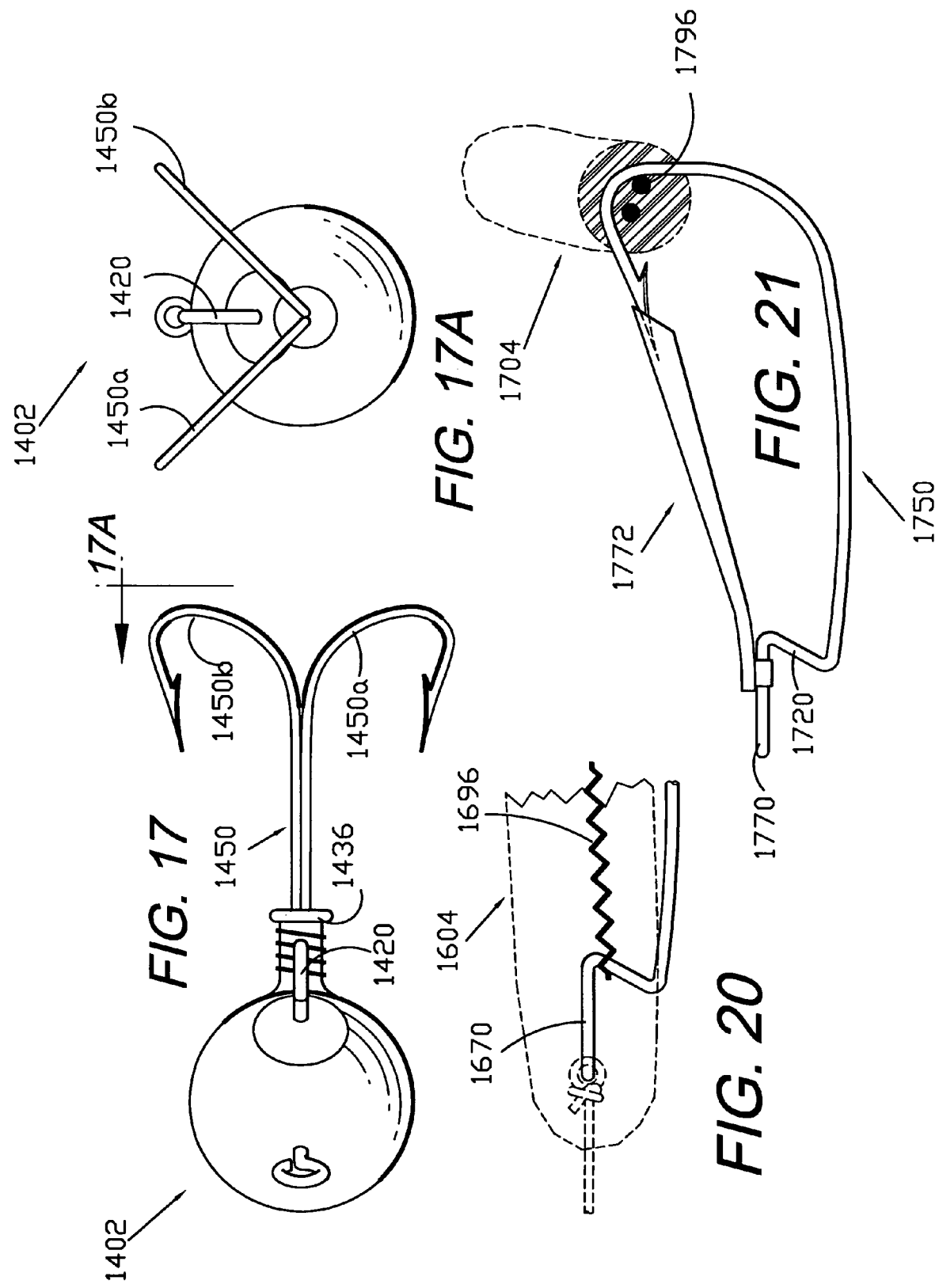

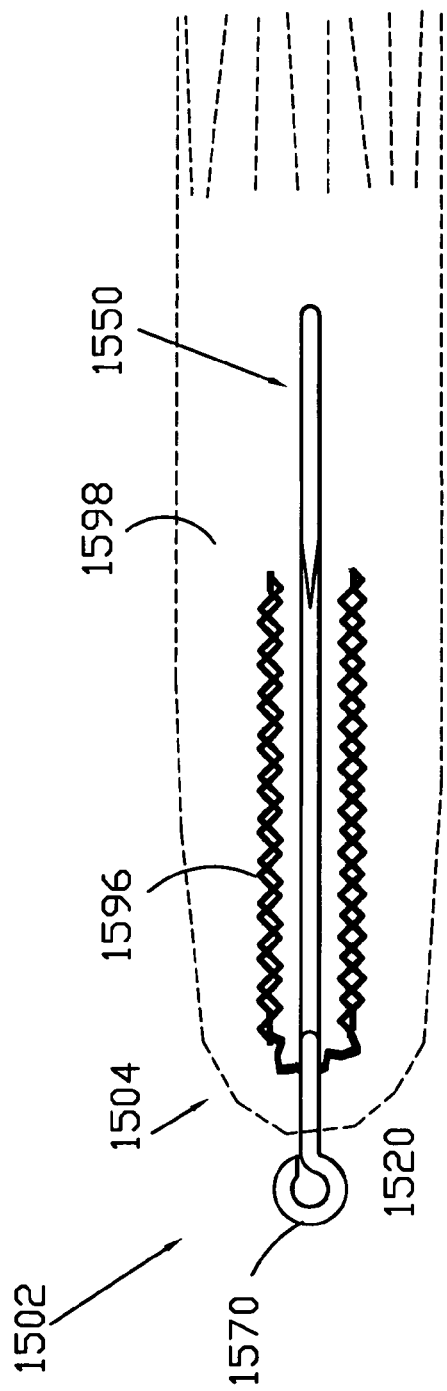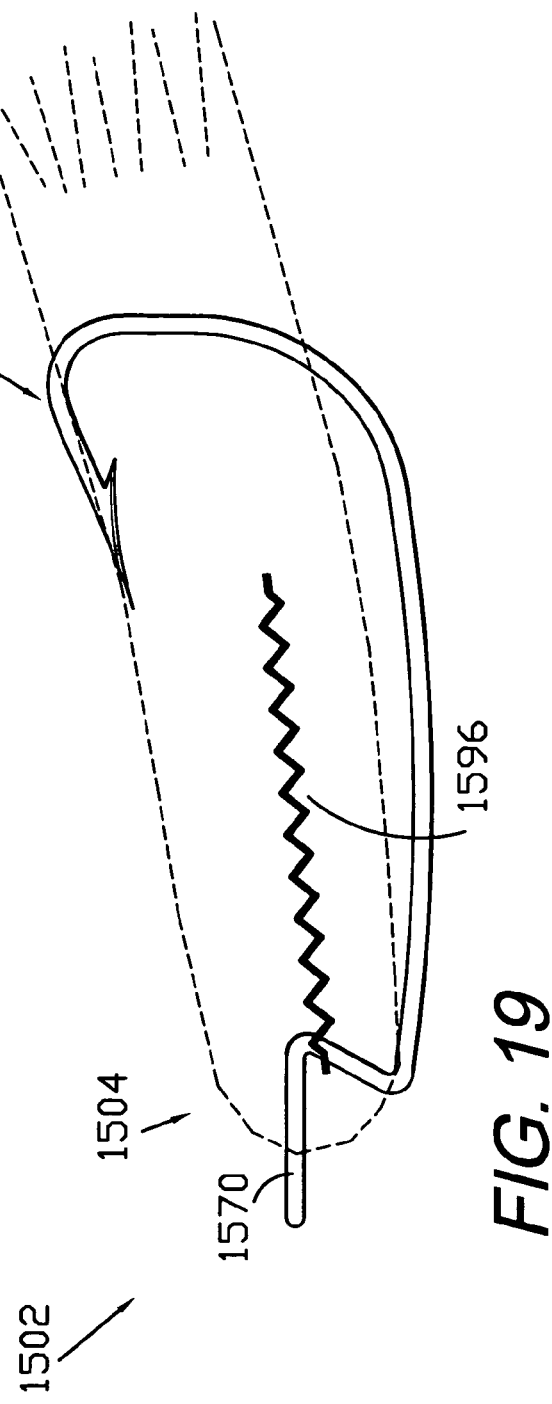

JIG AND BAIT SYSTEM

BACKGROUND OF THE INVENTION

1. Field of the Invention

The present invention relates generally to fishing jigs and lures and in particular to jigs or hooks for mounting bait.

2. Description of the Related Art

Various fishing bait devices are available within the fishing industry to attract fish and allow the reuse of the bait. The devices which are used include fishhooks with barbs or burrs that flare from the shank of the hook. These barbs are formed by peeling or shaving a portion of the shank to extend at a preferred angle. The barbs are formed to resist withdrawal of the lure or live bait that is mounted around the barbs. However, the barbs do not prevent the withdrawal of the lure or live bait. Often a fish will open its mouth and shake its head back and forth upon striking the barbed hook causing the fishhook to be withdrawn. Also, the barbs do not prevent the bait from sliding down the fishhook and obstructing the pointed end of the fishhook. It would be beneficial to have a lure or bait device that prevents the hook from being withdrawn or "spit out" by the fish and prevents the bait from sliding down the hook. In addition to spitting out the hook, fish can sometimes remove the bait from the hook without being captured.

Realistic lures and live bait are often utilized to attract fish onto a hook. Because of the realistic nature of many of these lures or live bait systems, fish can often remove the lure or bait from the line without being hooked. Some systems attempt to prevent the removal of the bait by utilizing an external locking member that has to be added to and fixedly secured to jigs and lures. These external locking members can detract from the realistic nature of the bait. In addition, barbs, the pointed-end of the fishhook or external locking members can become entangled in the weeds or embedded in the rocky ground. Some attempts to address this problem include incorporating a weedguard into the head of the jig. However, the addition of the weedguard created additional problems, including interfering with the fishhook or causing the jig to rotate horizontally allowing the fishhook to be removed from a fish's mouth. Other attempts to solve this problem included utilizing a "Texas rig" configuration, which uses jig configured with a fishhook point embedded in the body of the bait. However, these Texas rigs as well as conventional jigs allow the bait to slide down the hookshank and obstruct the hookpoint. It would be an advantage to use an internal reinforcing mechanism for bait systems which prevented removal of the bait, snagging of the jig or unwanted obstruction of the fishhook point.

Another problem with current bait systems is that it can be difficult and time consuming to change the attracting element. In some conditions, one type of bait can be more effective for attracting fish than another type of bait. This can be based on the type of fish, the environmental conditions and the underwater conditions. The fisher who begins the day under certain conditions may find that they change throughout the day and the lure or live bait system they began the day with is no longer effective. In this situation, the fisher may want to change the lure or bait being used. However, the time needed to change the bait system consumes valuable fishing time at a time when the fish may be striking. It would be advantageous to have an internally reinforced bait system which is easily changeable, producing the effectiveness of the jig at catching fish with the features of a weedguard system while preventing unwanted movement of the bait.

Prior part attempts to address these problems include the device shown in Huppert U.S. Pat. No. 6,405,477, which discloses a barbed stem which can be used to support live bait or artificial dressing. Peddycoart U.S. Pat. No. 5,548,920 discloses a locking mechanism for quick interchange. However, heretofore there has not been available a jig and bait system with the advantages and features of the present invention.

SUMMARY OF THE INVENTION

In the practice of the present invention, a jig and bait system is provided that satisfies the needs of providing an internally reinforced jig and bait system which is easily changeable with the effectiveness of the jig at catching fish and the features of a weedless system, which prevents the unwanted removal or movement of the bait. The jig and bait system includes a body connected to a bait keeper and a neck. The body and neck could be comprised of various types of materials such as lead, bismuth, plastic or other material types. The neck extends outwardly for securing a skirt and a fishhook. The skirt at least partially covers the fishhook. Optionally, the jig and bait system may include a latch for retaining a fish and a reinforcing filament.

BRIEF DESCRIPTION OF THE DRAWINGS

FIG. 1a shows a top plan of the jig and bait system.

FIG. 2a shows a top plan of the elliptical body embodiment of the jig and bait system.

FIG. 6 shows a side elevation of an alternative offset spinner blade embodiment of the jig and bait system.

FIG. 7 shows a side elevation of an alternative inline spinner blade embodiment of the jig and bait system.

FIG. 12 shows a side elevation of an alternative latch embodiment of the jig and bait system.

FIG. 13 shows a side elevation of the alternative latch embodiment in the open position of the jig and bait system.

FIG. 14 shows a section of the alternative latch embodiment of the jig and bait system taken generally along line 14 in FIG. 12.

FIG. 17 shows a top plan of an alternative multiple-hooked embodiment of the jig and bait system.

FIG. 17A shows a side elevation of an alternative multiple-hooked embodiment of the jib and bait system.

FIG. 18 shows a top plan of a reinforced artificial bait embodiment of the jig and bait system.

FIG. 19 shows a side elevation of a reinforced artificial bait embodiment of the jig and bait system.

FIG. 20 shows a side elevation of an alternative reinforced artificial bait embodiment of the jig and bait system.

FIG. 21 shows another side elevation of the alternative reinforced artificial bait embodiment of the jig and bait system.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "outwardly" and "externally" refer to directions out and away from, respectively, the geometric center of the embodiment being described and designated parts thereof. Said terminology will include the words specifically mentioned, derivatives thereof and words of similar meaning.

II. Jig and Bait System 2

Figure 1:
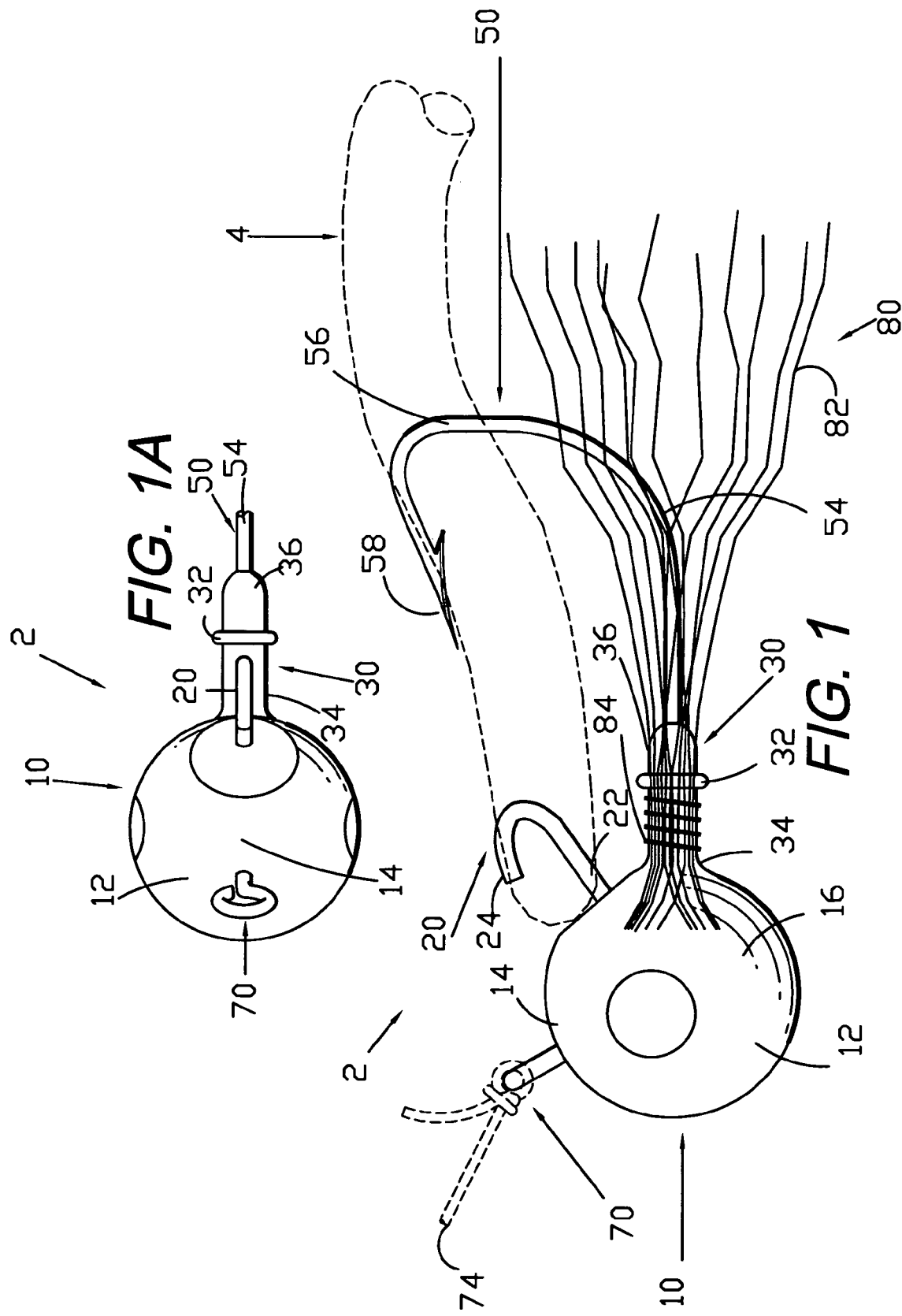
FIG. 1 shows a side elevation of a jig and bait system embodying the present invention.

Referring to the drawings in more detail, the reference numeral 2 generally designates a jig and bait system for attracting and capturing fish with bait 4 including a regular shaped body 10, a bait keeper 20, a neck 30, a fishhook 50 and a line connector 70. The present invention can be configured using various types of materials for lures and jigs including; jigs, spinnerbaits, buzzbaits, crankbaits, Texas rigs, inline spinners and other bait system configurations. FIG. 1 depicts the system 2 with: a round body 10 having an exterior surface 12, a top 14 and a bottom 16; a bait keeper 20 with a keeper proximate end 22 and a keeper distal end 24; a neck 30 with an annular collar 32, a neck proximate end 34 and a neck distal end 36; a fishhook 50 with a fishhook extension section 54, a fishhook curved return section 56 and a fishhook pointed distal end 58; and a line connector 70. As depicted in FIG. 1, the bait 4 is attached at the bait keeper 20 in addition to being secured on the fishhook 50. The bait keeper 20 secures the bait 4 aligned with the fishhook 50 and allows the bait 4 to be changed rapidly while maintaining the same jig and bait system. To change the bait 4 the user simply unhooks the bait from the fishhook 50 and removes the bait from the bait keeper 20. In this manner the user of such a system can quickly and easily switch the bait 4 when desired while the system 2, during use, prevents unwanted removal of the bait 4 by joining it to the bait keeper 20 and securing it with a fishhook 50. The bait keeper 20 in one embodiment also enables the fishhook pointed distal end 58 to become imbedded in the bait 4 and protects the fishhook pointed distal end 58 from underwater obstructions.

In one embodiment, the system 2 also includes a skirt 80. The skirt 80, extending from the neck distal end 36 and partially covering the fishhook extension section 54, is comprised of flexible strands 82 which are secured to the system 2 by a skirt retainer 84 and the annular collar 32 on the neck 30. The flexible strands 82 of the skirt 80, in one embodiment, provide flexibility to the skirt 80 while maintaining a realistic appearance in the water. In addition, although the skirt retainer is depicted as a filament such as a thread or wire it could include other fastening mechanisms including flexible tubing. The skirt 80 is capable of being secured to the neck 30 in the various embodiments illustrated in the following figures and is depicted in outline shape to allow for better visibility of the unique features shown in the illustrated embodiments.

FIG. 1A shows one embodiment where the neck extends out of the body 10 and the fishhook 50 extends out of the neck distal end 36. In FIG. 1A the line connector 70 can also be seen outwardly extending from the exterior surface 12 of the body 10. The line connector 70 is located towards the top 14 of the system 2 allowing the system to be properly orientated while connected on a fishing line 74.

As seen in FIG. 1A the bait keeper 20 is connected to the exterior surface 12 of the body 10 above the neck 30 and generally behind the line connector 70. In addition, the annular collar 32 can be seen positioned between the neck proximate end 34 and the neck distal end 36. In the illustrated embodiment, the fishhook extension section 54 is received by the neck 30 extending from the neck distal end 36. However the system 2 is not limited to such configurations and may in fact alternate the locations of the bait keeper 20, the neck 30 and the fishhook 50 depending on the anticipated fishing conditions and the desired features to address those conditions.

Figure 2:
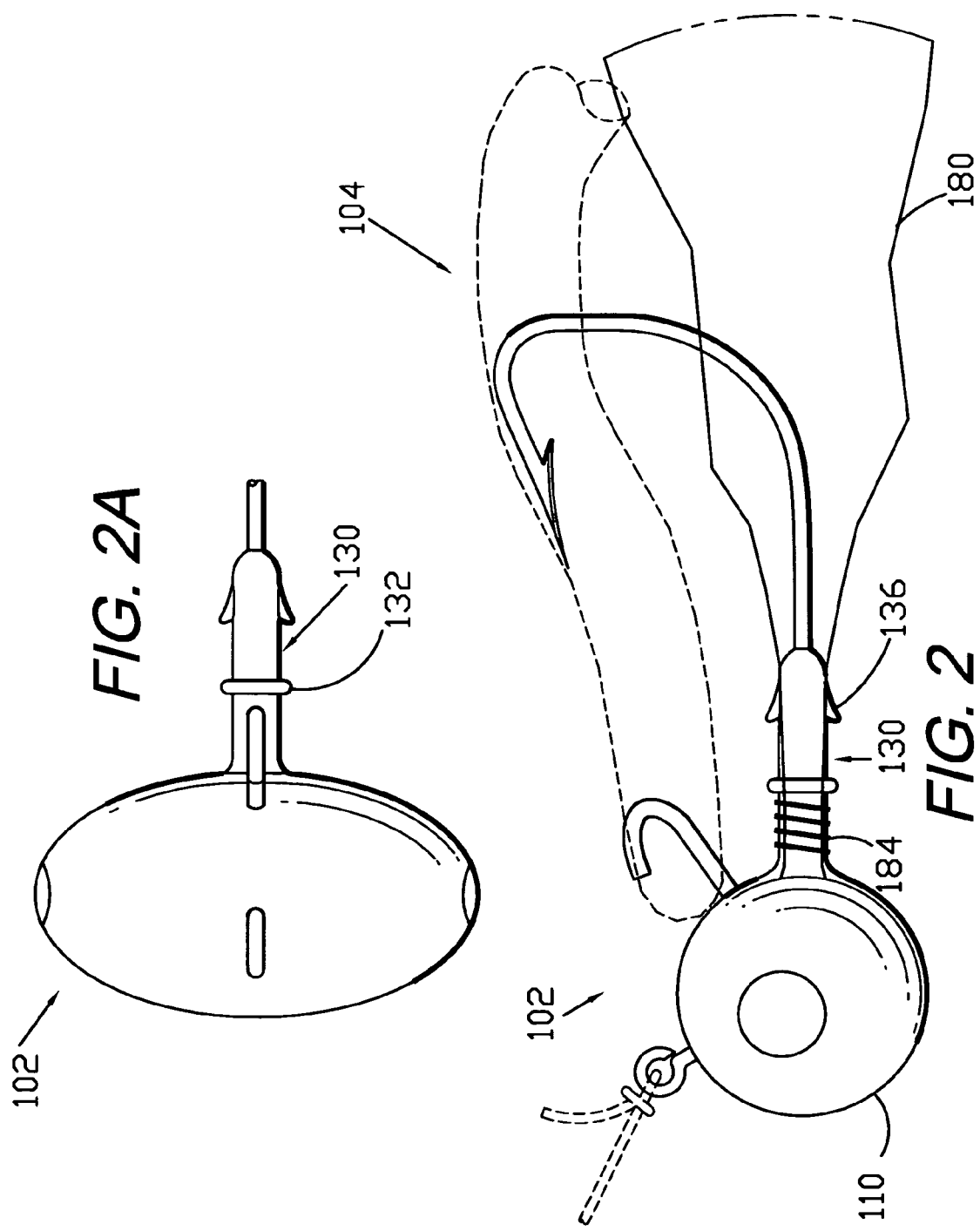
FIG. 2 shows a side elevation of an alternative elliptical body embodiment of the jig and bait system.

FIG. 2 illustrates an alternative embodiment in which the body 110 is elliptically shaped. FIG. 2 also illustrates an alternative embodiment of the neck 130 in which the neck distal end is flared outward enabling the neck to support and secure bait 104. The remaining aspects of the system are similar to FIG. 1 including the skirt 180 outlined in FIG. 2 for clarity purposes. FIG. 2A depicts the system without the annular skirt retainer 184 or skirt 180 even though the system is adapted for encircling the skirt by the annular skirt retainer 184 where the annular skirt retainer 184 is secured on the neck 130 by the annular collar 132.

Figure 3:
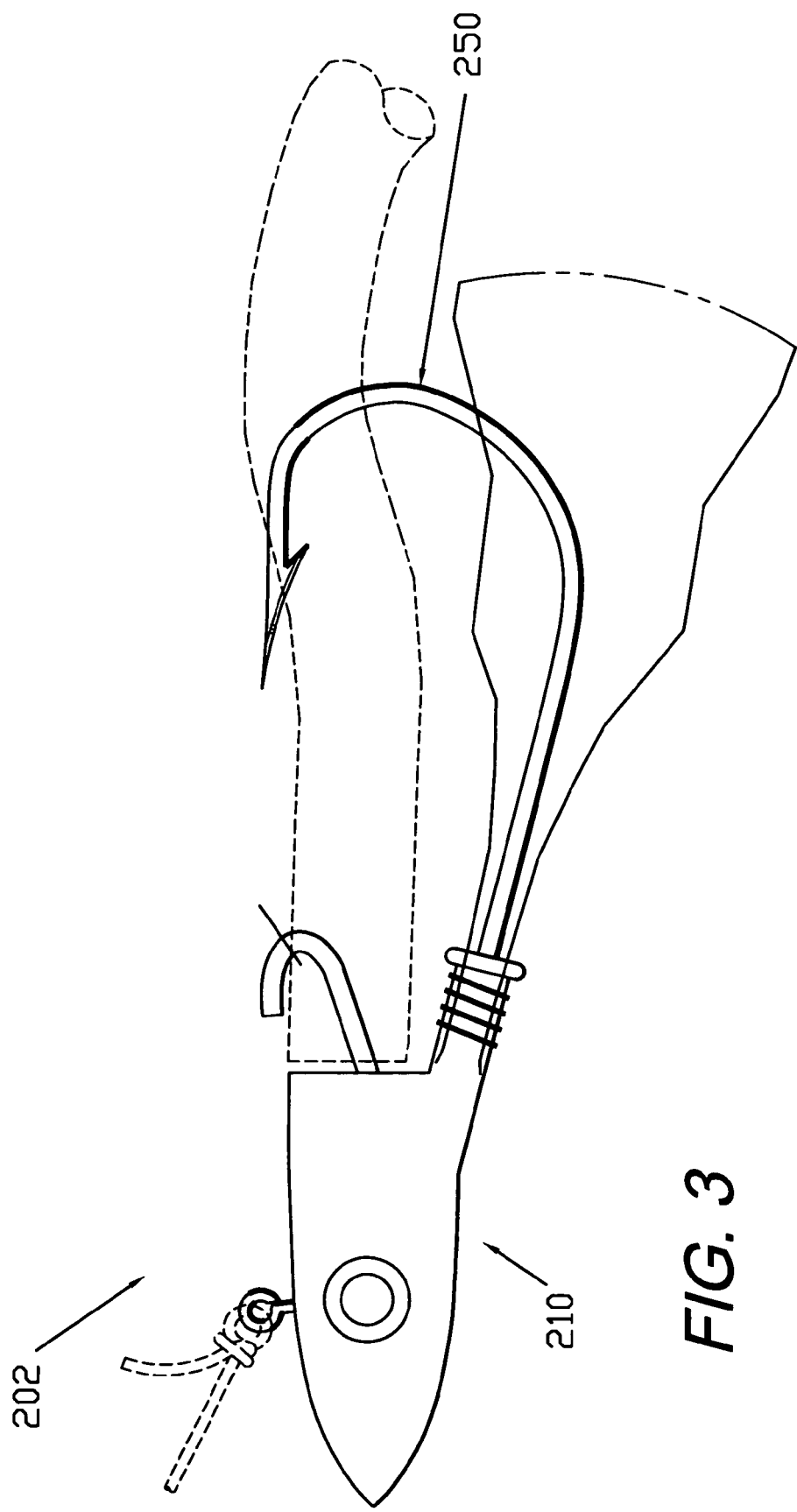
FIG. 3 shows a side elevation of an alternative elongated body embodiment of the jig and bait system.

FIGS. 3 through 7 illustrate the adaptability of the body which is utilized in the current system. The body 210, 310, 410, 510, 610 and 710 (FIGS. 3–7 respectively) can be formed in a variety of fish attracting shapes, including but not limited to fish, insects, jigheads, buzzbaits, spinnerbaits, inline spinners, swimbait heads, crankbait heads, horsehead jigs or other fanciful shapes. In FIG. 3 the fishhook 250 is shown using an alternative shape, illustrating the diversity of fishhook shapes that can be utilized in the present invention.

Figure 4:
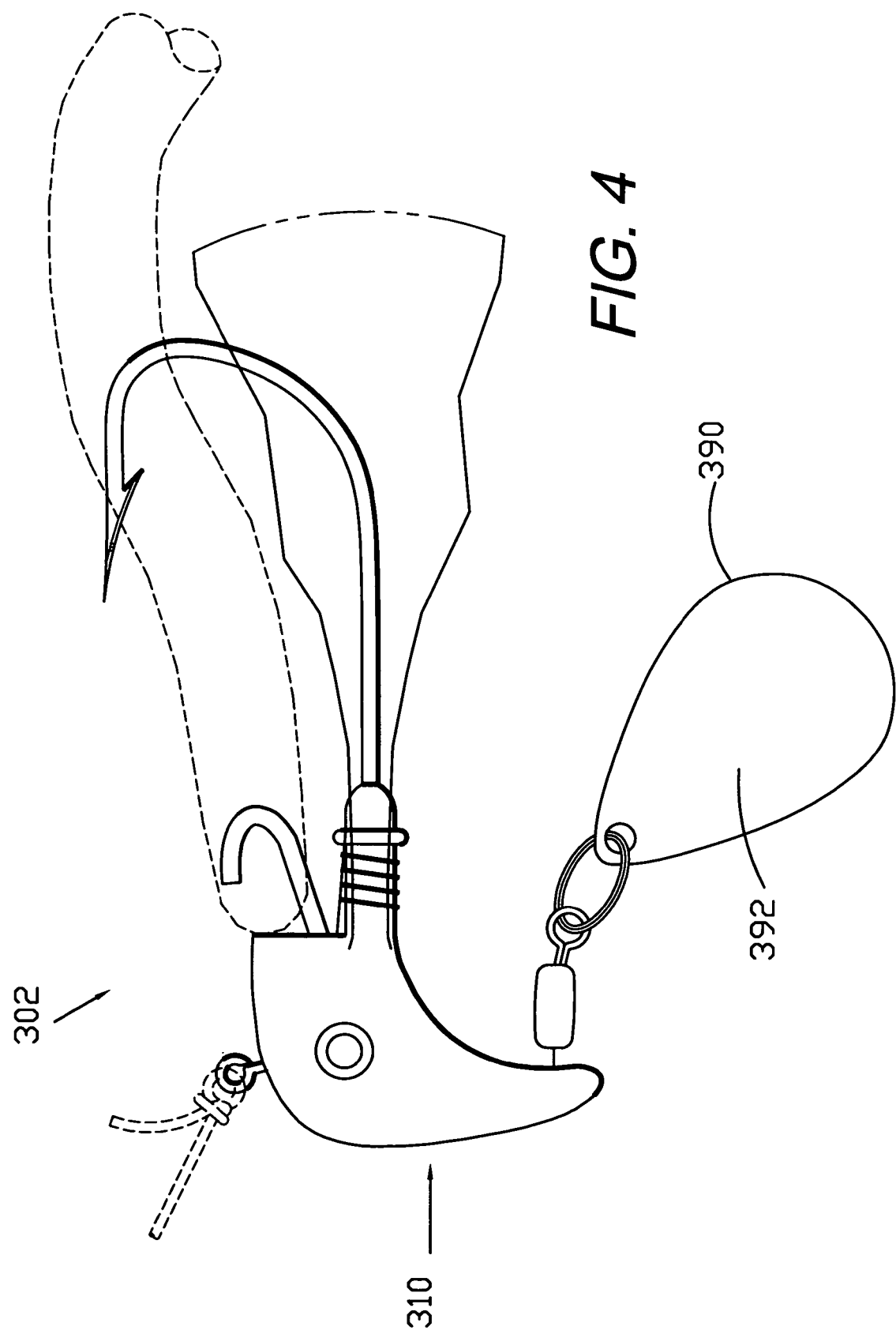
FIG. 4 shows a side elevation of an alternative spinner blade embodiment of the jig and bait system.

FIG. 4 illustrates the jig and bait system 302 optionally utilizing a spinner blade 390 attached to a horsehead jig body 310 to assist in attracting fish. As the system 302 moves in the water, the spinner blade 390 rotates a reflective surface 392 for attracting fish.

Figure 5:
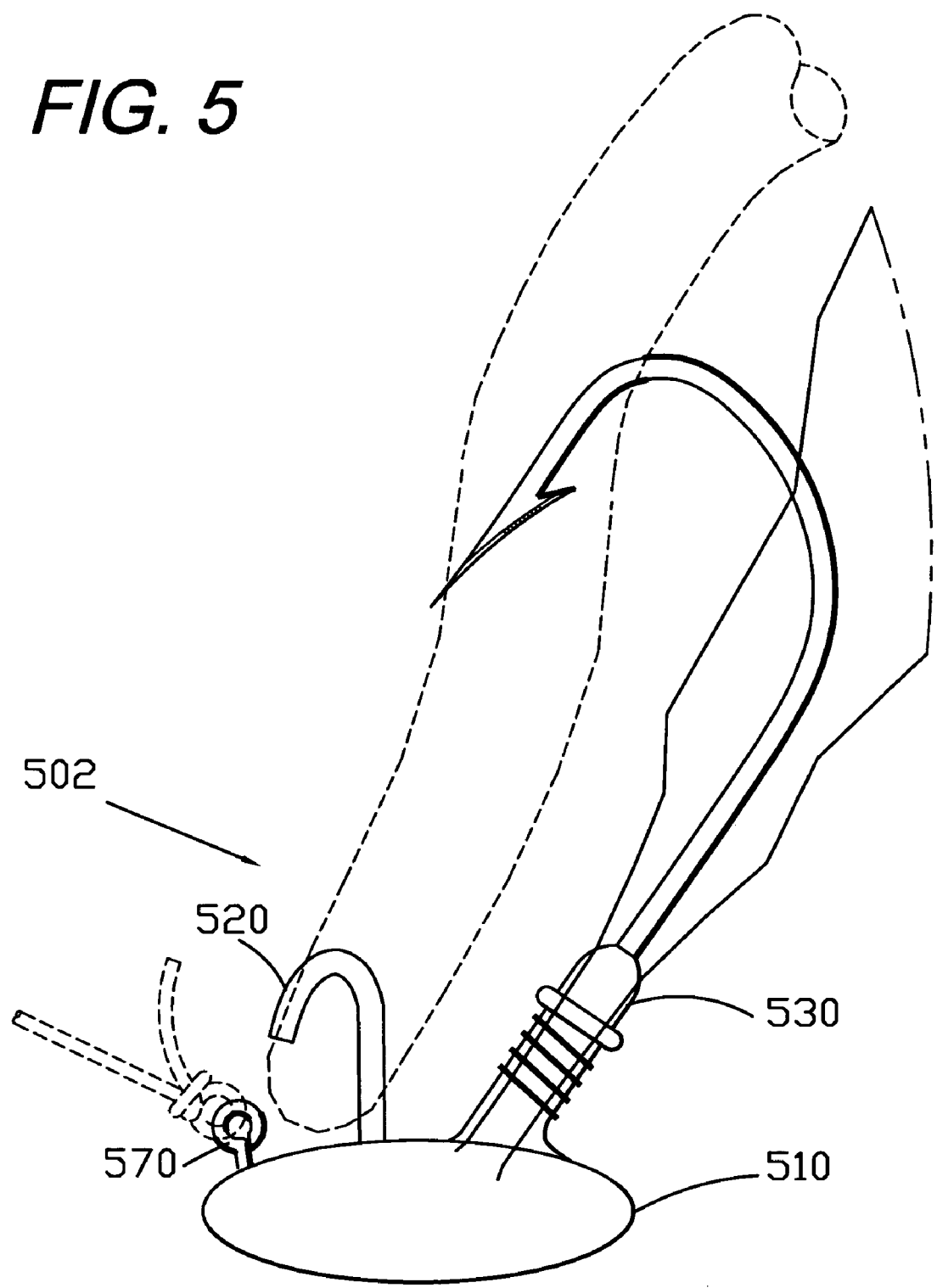
FIG. 5 shows a side elevation of an alternative elongated body embodiment of the jig and bait system.

FIG. 5 illustrates an alternative embodiment of the jig and bait system 502 with an stand-up head body 510, a line connector 570, a bait keeper 520 and a neck 530. FIG. 6 illustrates an alternative wire-frame buzzbait/spinner bait embodiment jig and bait system 602 with a jig 610 and a line connector 670 rotatably mounting a spinner blade 690.

FIG. 7 illustrates an alternative inline spinner/buzzer configuration 702 in which a spinner blade 790 is attached to a line connector 770, which is also attached to the body 710. In this alternative embodiment, as the system 702 moves in the water the spinner 790 rotates the reflective surface 792 to assist in attracting fish.

Figure 8:
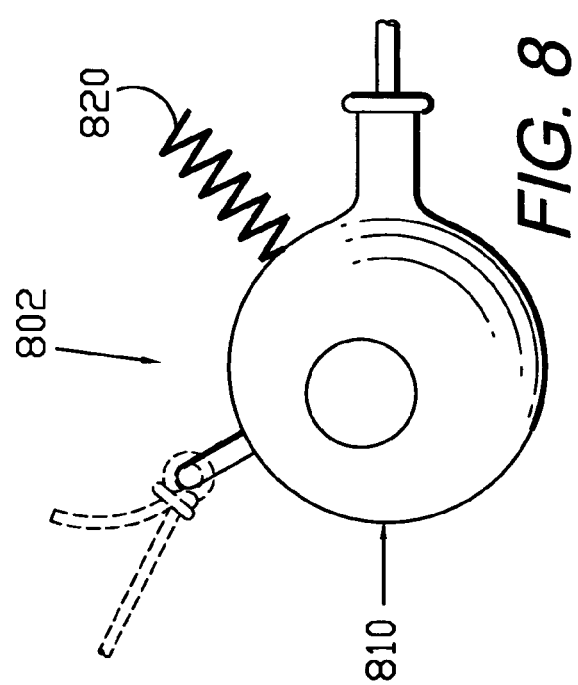
FIG. 8 shows a side elevation of an alternative spiral bait keeper embodiment of the jig and bait system.

FIG. 8 illustrates an alternative spiral-shape screw bait embodiment system 802 in which a bait keeper 820 has different characteristics for use with different types of bait. The bait keeper 820 extends outwardly from a body 810 to secure the bait. The keeper 820 has a spiral shape to provide different mounting characteristics to secure bait thereon.

Figure 9:
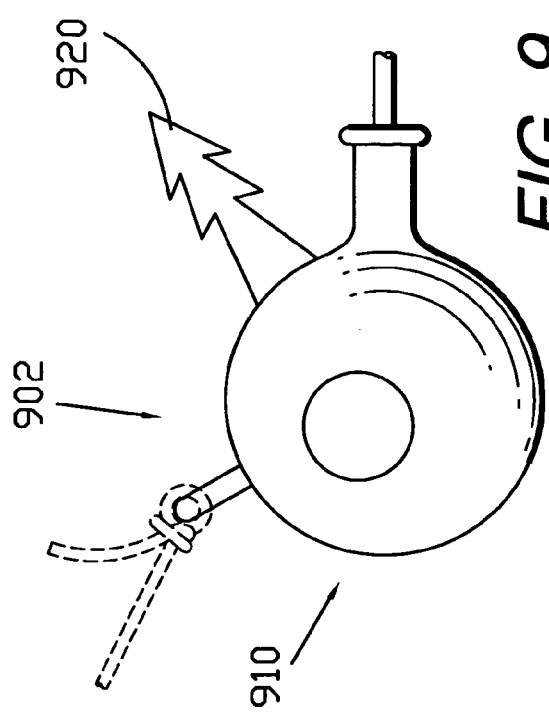
FIG. 9 shows a side elevation of an alternative spear-barbed bait keeper embodiment of the jig and bait system.

FIG. 9 illustrates another alternative bait keeper 920 configuration in which the keeper 920 is configured in a lance shape to provide different mounting characteristics to secure the bait on the bait keeper 920 and to assist in penetrating the bait.

Figure 11:
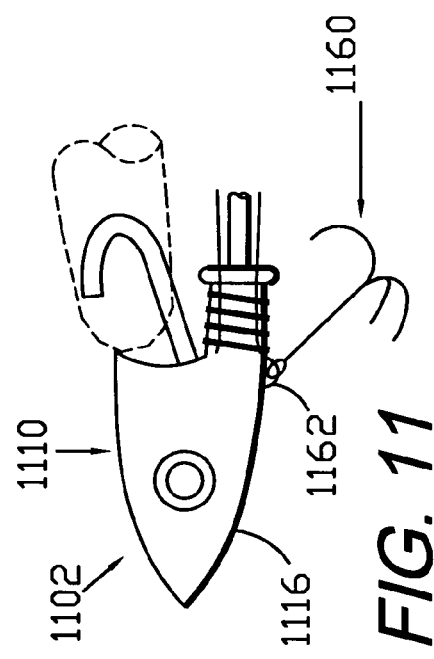
FIG. 11 shows a side elevation of an alternative hook embodiment of the jig and bait system.
Figure 10:
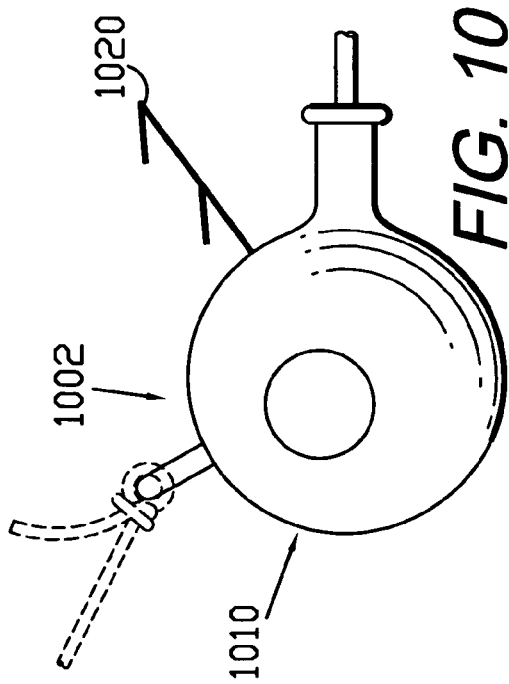
FIG. 10 shows a side elevation of an alternative double-hanger bait keeper embodiment of the jig and bait system.

FIG. 10 illustrates another embodiment in which a bait keeper 1020 utilizes a double-hanger configuration to secure the bait. FIG. 11 illustrates an alternative embodiment with a secondary fishhook 1160 secured to a body 1110 using a fishhook connector 1162. Although the fishhook connection 1162 is depicted on the bottom 1116 of the body 1110, the fishhook connection 1162 is not limited to a bottom orientation.

FIG. 12 depicts an alternative latching embodiment in which the system provides a latch 1272 with a latch extension section 1278 extending from a latch proximate end 1274 and terminating at a latch distal end 1276 to capture a fish on the fishhook 1250. The latch can be used in conjunction with a bait keeper or as a substitute for a bait keeper. In addition, the latch 1272 can serve as a weedguard, protecting the fishhook 1250 from underwater obstacles. In one embodiment, the bait 1204 can be threaded onto the latch 1272 with the bait 1204 at least partially covering the latch 1272. Alternatively, the bait be configured with a slot in which the latch 1272 is inserted with the fishhook pointed distal end 1258 received by the latch proximate end 1274 while both are received inside a slotted portion 1206 of the bait 1204. As contact is initiated by a fish when the fish exerts sufficient pressure, such as upon hookset, the latch mechanism exposes the fishhook pointed distal end 1258 to allow capture of the fish. The alternative bait configuration is also adapted to receive the bait keeper 1220 in a solid section 1208 of the bait which is arranged adjacent to the slotted section 1206 of the bait 1204.

In addition, the latch 1272 can protect the fishhook from underwater obstacles and the latch 1272 provides tension on the bait 1204 preventing false or early removal of the bait 1204 and creating a barrier to prevent captured fish from spitting out the fishhook 1250 or allowing the fish to throw the fishhook 1250. The tension is created by using a latch 1272 comprised of a high-strength, high-memory characteristic material. The high-strength characteristic prevents the fish from getting free and the high-memory characteristic creates a closing bias in the latch 1272. The latch 1272 swings from a closed position to an open position upon contact with the fish and returns towards its closed position after the fishhook captures the fish, such as when the fishhook pointed distal end 1258 pierces the mouth of the fish. The fish is prevented from moving off the fishhook pointed distal end 1258 even when the fishhook pointed distal end 1258 does not pierce the mouth of the fish by causing pressure against the fish, preventing the fish from removing the fishhook pointed distal end 1258. To prevent a false opening of the latch mechanism 1272, such as when the fishhook 1250 comes into contact with tree branches or rocks, and to provide sufficient strength to securing the fish, the latch is constructed of a high strength material. The latch 1272 can be comprised of a metallic, semi-metallic or non-metallic material. Preferably, the latch 1272 is comprised of a non-oxidizing metallic material such as titanium or stainless-steel.

FIG. 12 illustrates the closed position of the latch 1272. In the closed position, the fishhook distal end 1258 will be received by the latch distal end 1276. When contact with a fish occurs, the latch extension section 1278 pivots in a clock-wise motion allowing the fishhook pointed distal end 1258 to capture the fish. After capture of the fish, the latch extension section 1278 is urged back towards the closed position.

FIG. 13 illustrates the latch 1272 in an open position with the extension section 1278 be deformed downward with the latch distal end 1276 being separated from the fishhook pointed distal end 1258. In one embodiment the latch 1272 is received by a slotted section 1206 which is adjacent to a solid section 1208 of the bait 1204. FIG. 14 illustrates a cross-section of the latch distal end 1276 taken along line 14 in FIG. 12. The V-shape of the latch distal end 1276 is adapted to receive the fishhook pointed distal end 1258 by the latch distal end 1276. As shown in FIG. 12, the latch 1272 tends to retain the bait 1204 in place on the hook 1250.

Figure 15:
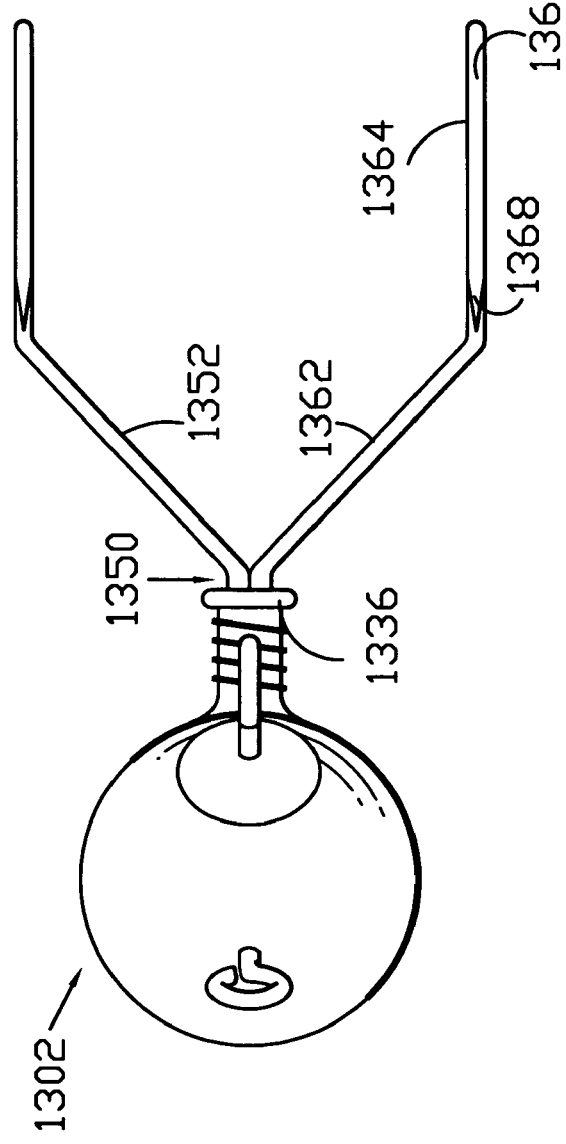
FIG. 15 shows a top plan of an alternative multiple-hook embodiment of the jig and bait system.
Figure 16:
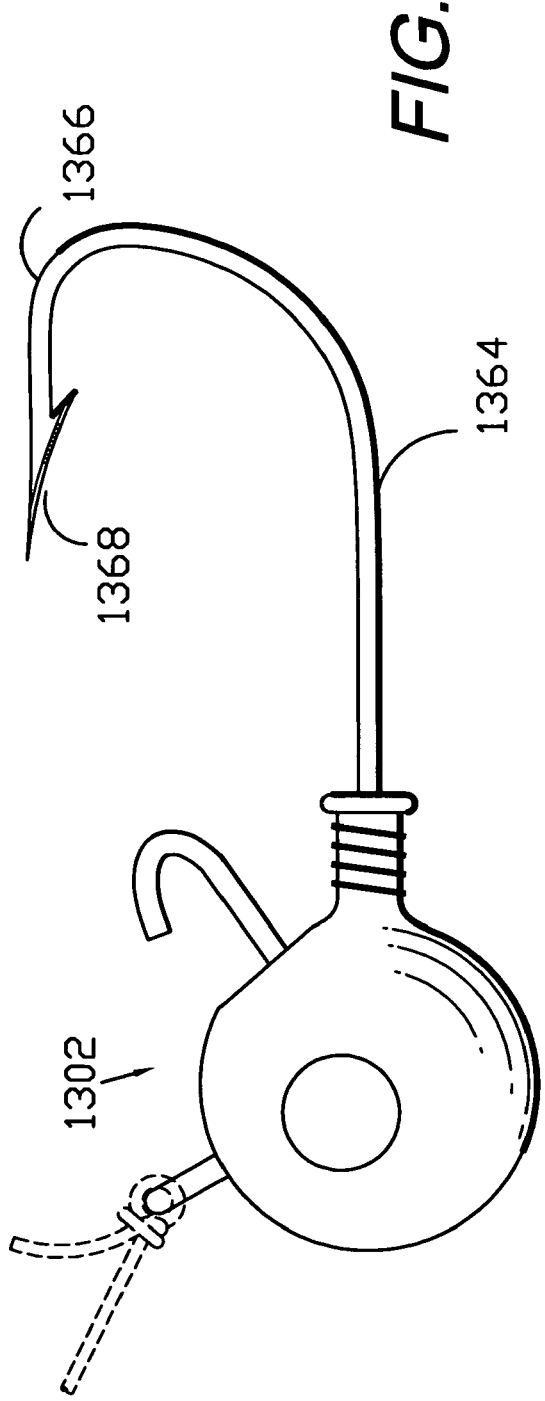
FIG. 16 shows a side elevation of the alternative multiple-hooked embodiment of the jig and bait system.

FIGS. 15 and 16 show an alternative embodiment double-hooked fishhook 1350 in which a first angled fishhook extension section 1352 and a complementary secondary angled fishhook extension section 1362 are angled relative to the longitudinal axis of the system. Both the first and second fishhook angled extension sections 1352, 1362 are connected to and extend from the neck distal end 1336 and the secondary fishhook extension section 1364 is connected to the secondary angled fishhook extension 1362 and to the secondary curved return section 1366 which terminates at the secondary fishhook pointed distal end 1368. Although FIG. 16 shows a double-fishhook 1350, there are various alternative configurations including multiple hooks and alternative fishhook alignments. For example, in FIG. 17, fishhooks 1450 with different configurations 1450 are shown without the fishhook angle extension sections. As illustrated in FIG. 17A taken along line 17A in FIG. 17, the fishhooks are rotated relative to one another between 0 and 180 degrees with the bait keeper 1420 oriented towards the top.

FIG. 18 illustrates an embodiment of the bait 1504 which is artificial. Alternatively, the bait could be live. As illustrated, the artificial bait 1504 is internally reinforced with a filament 1596 which is embedded into the flexible bait material 1598. The flexible bait material 1598 could be formed using various material types to provide different fishing characteristics including plastisol. The use of the bait keeper 1520 provides for rapid removal and changing of the bait 1504 while preventing movement of the bait during use.

FIG. 18 illustrates the bait keeper 1520 inserted into and securing the bait 1504 by positioning the bait keeper 1520 inside the flexible bait material 1598 such that the filament 1596 enables the bait keeper 1520 to secure the bait 1504. When the system 1502 is in use, the bait 1504 may experience a dragging force from a fish or the water causing the bait to move in direction opposite to the movement of the system 1502. By internally reinforcing the bait 1504 with the filament 1596 and securing the bait with the bait keeper 1520, the filament 1596 and the bait keeper 1520 join to secure the bait. In addition, as illustrated in FIG. 19, the bait 1504 is secured using the fishhook 1550. Although the reinforcing filament 1596 can include a number of different fibers and materials, preferably the filament 1596 is a braided acrylic yarn which is frictionally secured by the flexible bait material 1598. In FIGS. 18 and 19 the line connector 1570 is external to the bait. Alternatively, FIG. 20 illustrates the line connector 1670 being positioned internally with respect to the bait 1604 which has an internal filament 1696. FIG. 21 shows another alternative embodiment in which the internally reinforcing filament 1796 threaded bait 1704 is baited onto a fishhook 1750 with a latch mechanism 1772 attached to the keeper 1720, the keeper 1720 connecting the fishhook 1750 to the line connector 1770.

What is claimed is:

1. A jig and bait system comprised of:
   a body including an exterior surface;
   a neck having a proximate end connected to the body and a distal end, said neck including an annular collar positioned between said neck proximate end and said neck distal end;
   a fishhook including a shaft with a fishhook extension section connected to and extending from the neck distal end, a fishhook curved return section connected to the fishhook extension section, said fisbhook return section terminating at a fishhook pointed distal end;
   a bait keeper including a keeper proximate end connected to said body exterior surface above said neck proximate end, said keeper further including and terminating at a keeper distal end said keeper being adapted to receive bait thereon;
   a line connector connected to said body exterior surface and extending outwardly therefrom;
   a skirt comprising a plurality of flexible strands;
   an annular skirt retainer encircling said skirt and said neck between said neck proximate end and said collar, said skirt being retained on said neck by said skirt retainer and said collar with said skirt extending from said neck distal end and at least partly covering said fishhook extension section;
   a latch having a latch proximate end, a latch distal end, an open position and a closed position;
   the latch proximate end extending outwardly from the body exterior surface;
   the latch distal end being pivotally connected to said latch proximate end, said latch distal end adapted for receiving the fishook pointed distal end;
   said latch being biased upward with said latch distal end being urged towards the fishhook pointed distal end when said latch is in the closed position;
   said latch being deformed downward with said latch distal end being separated from said fishhook pointed distal end when said latch is in said open position such that said latch is biased toward the closed position when in the open position;
   said latch is internally received by an artificial lure;
   said lure includes a cylindrical flexible trailer simulating live bait said cylindrical flexible trailer further including a slotted section connected to a solid section said slotted section adapted for receiving said latch, a reinforcing filament threaded through the solid section, said solid section adapted for receiving the bait keeper; and said reinforcing filament adapted for securing the trailer on said bait keeper.

* * * * *